Jan. 13, 1959           F. A. LEE           2,868,310
MOTOR VEHICLE FENDER LOCKING MEANS
Original Filed Aug. 13, 1954           3 Sheets-Sheet 2
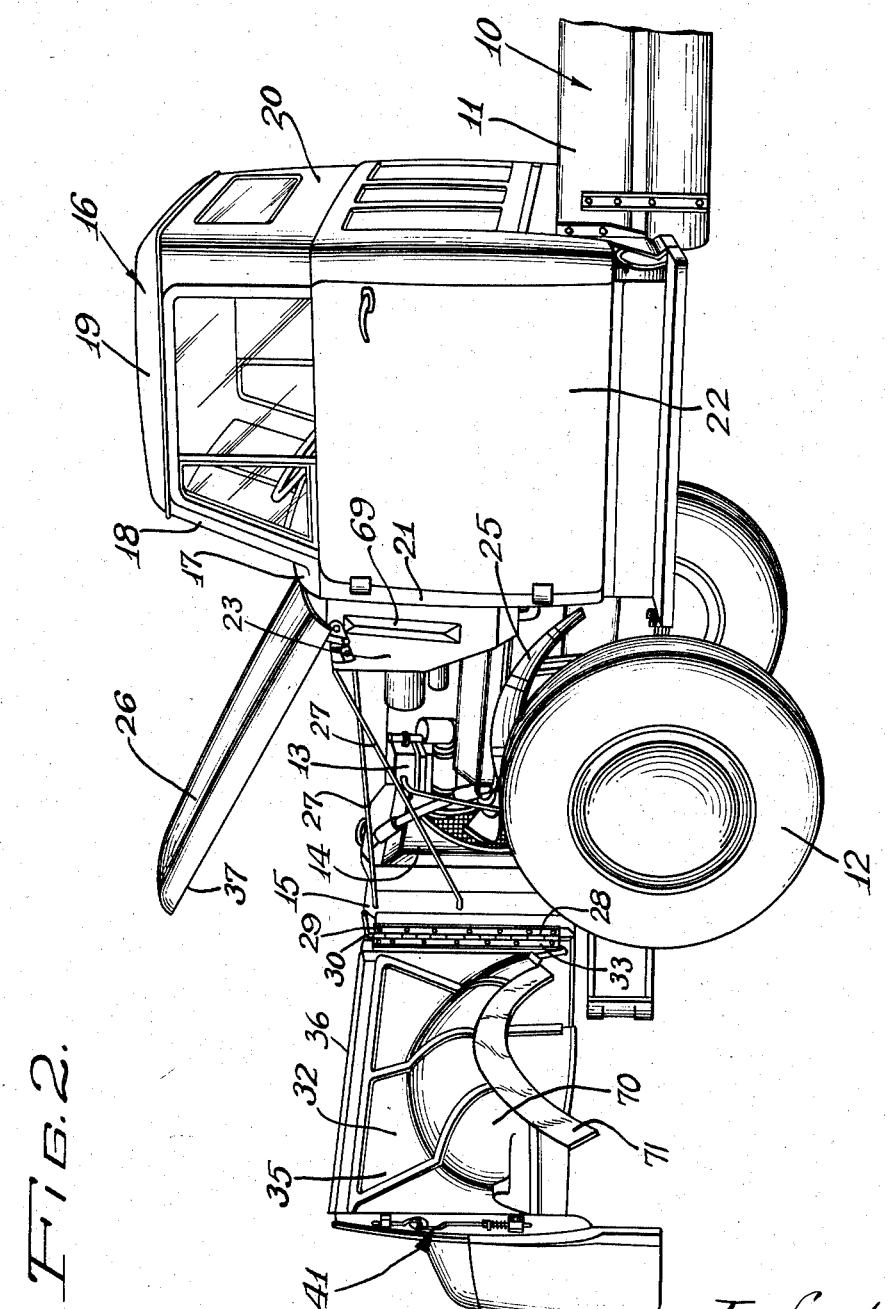
Inventor:
Fred A. Lee
Paul O. Pippel
Atty.

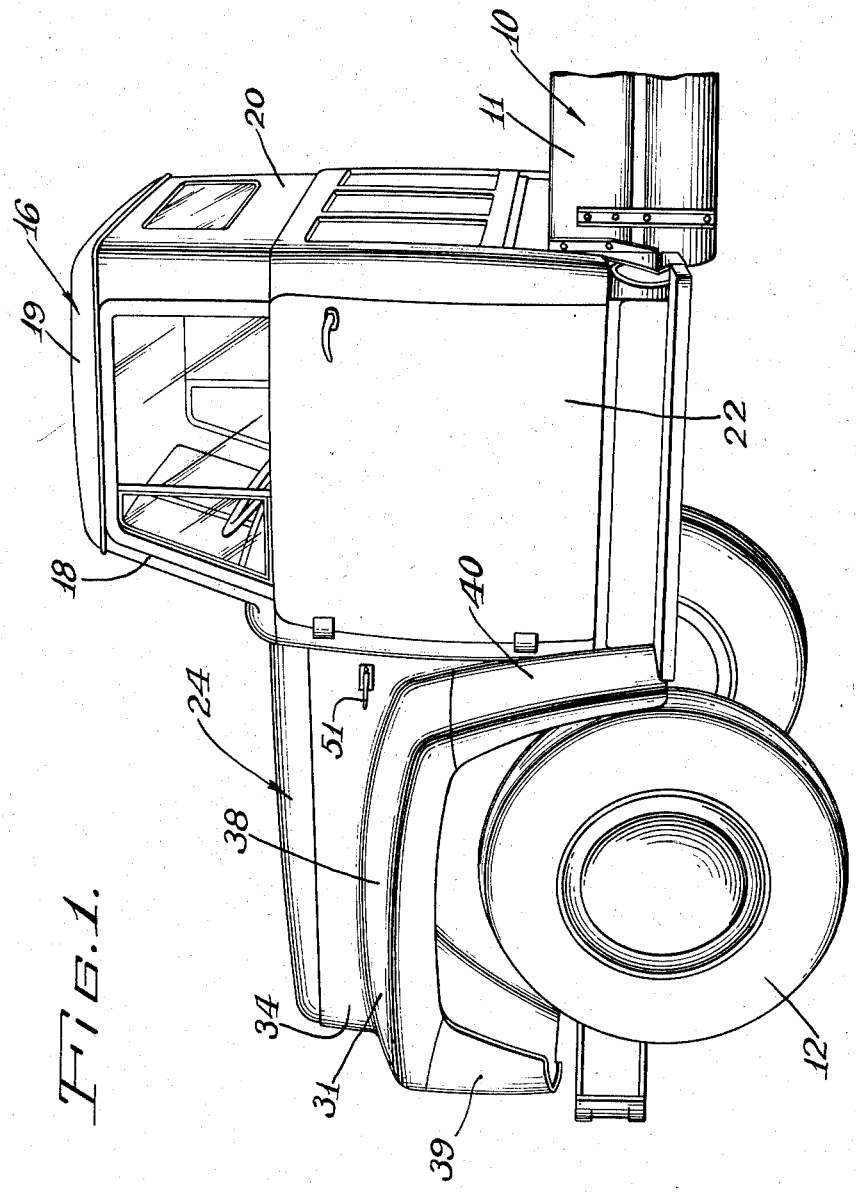

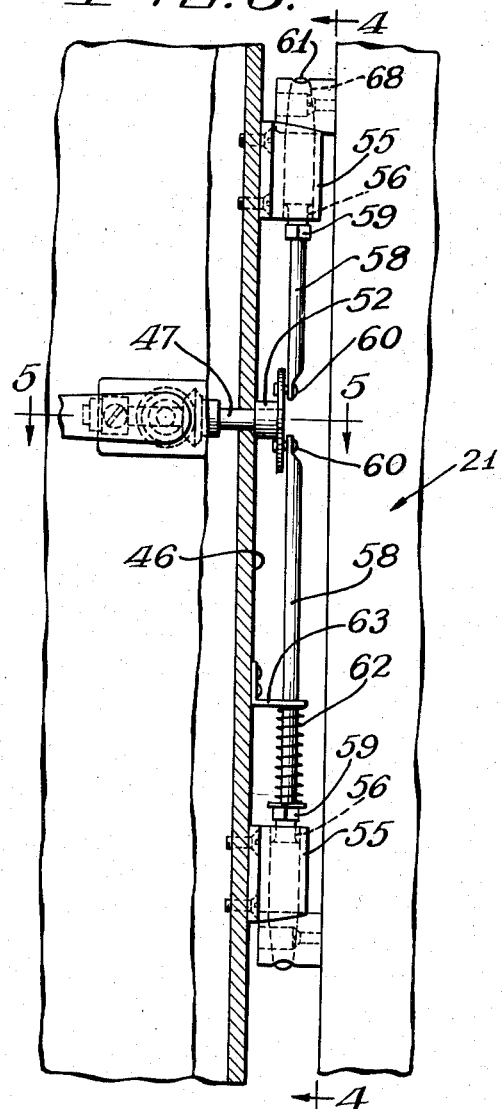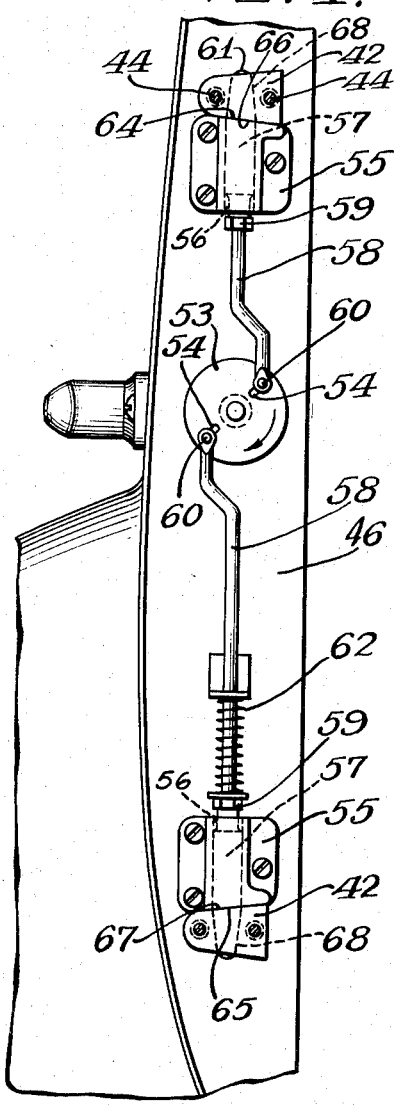

United States Patent Office 2,868,310
Patented Jan. 13, 1959

2,868,310

MOTOR VEHICLE FENDER LOCKING MEANS

Fred A. Lee, Fort Wayne, Ind., assignor to International Harvester Company, a corporation of New Jersey Original application August 13, 1954, Serial No. 449,740, now Patent No. 2,833,364, dated May 6, 1958. Divided and this application August 26, 1955, Serial No. 530,728

6 Claims. (Cl. 180—89)

This invention relates to a motor vehicle body construction and more particularly to a new and improved quick releasable locking device for connecting a pivotally mounted fender to the vehicle body. The present application is a division of applicant's copending application Serial No. 449,740, filed August 13, 1954, now Patent Number 2,833,364, for Motor Vehicle Body Construction.

The primary objective of the present invention is the provision of a novel quick releasable lock device for connecting a movable fender to a stationary part of a motor vehicle body. The lock device may be applied to a movable fender of the type illustrated in the above noted copending application. In that application the engine enclosure and wheel housings or fenders adjacent each side of the engine enclosure are formed of a plurality of sections or walls. Certain panels or sections of the engine enclosure and wheel housings are stationary as in conventional motor vehicles while others which normally engage the stationary sections to form the engine enclosure and wheel housings are movable to positions wherein the engine is substantially exposed and the wheels adjacent the engine are uncovered whereby the mechanic can assume a comfortable position between the wheel and engine when working on the engine.

A still further object is the provision of a new and improved quick releasable locking device for connecting a fender or part of the engine enclosure to the relatively stationary portions of a vehicle body in snug close-fitting engagement with each other.

A further object is the provision of a lock device for a swingable motor vehicle fender having a surface adapted to engage a surface carried by a stationary part of the motor vehicle body which includes cam means operable to force the engaging surfaces tightly together in such a manner as to mitigate the possibility of the sections rattling or squeaking during the operation of the vehicle.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a motor truck embodying the invention;

Figure 2 is a view similar to Figure 1 with the exception that the top panel of the engine enclosure is in its raised position and the wheel housing and engine enclosure side wall components are swung outwardly away from the normal inswung position assumed thereby;

Figure 3 is an enlarged fragmentary view of the releasable locking device; a portion of the wheel housing is cut away to better illustrate the locking device;

Figure 4 is a sectional view taken substantially along line 4—4 of Figure 3; and Figure 5 is a sectional view taken substantially along line 5—5 of Figure 3.

Referring to the drawings in detail wherein like reference characters designate like elements throughout the various views, there is shown a portion of a motor truck chassis frame 10 which includes longitudinally extending side sill members 11. A pair of steerable ground-engaging wheels 12 are resiliently suspended from the chassis frame 10 in a conventional manner.

A vehicle power plant 13 is mounted on the extreme forward end of the chassis frame 10. The engine or power plant 13 is shown somewhat diagrammatically since it forms no part of the present invention per se. The engine cooling liquid is circulated through an upright radiator core 14 supported on the chassis frame 10 and spaced forwardly of the engine 13 and is encircled by a vertical transversely extending grille panel 15 which is also supported by the chassis frame 10.

An operator's compartment designated generally by numeral 16 is supported by the chassis frame 10 rearwardly of the engine 13 and includes a cowl panel 17 and a windshield frame 18 integrally formed therewith. A roof 19 has a forward edge rigidly secured to the windshield frame 18 and has a rearward edge connected in a like manner to a back panel 20. Depending vertically from the transversely spaced ends of the cowl panel 17 are hinge pillar posts 21 which pivotally support the side doors 22. An inverted U-shaped cowl bar 23 is secured to the cowl panel 17. Suitably secured to the cowl bar 23 is a dash panel or fire wall, not shown, which is disposed between the engine 13 and the interior of the operator's compartment 16. The dash panel and the cowl bar 23 serve as a rear wall of the engine enclosure designated generally by numeral 24 and the grille panel 15 defines a forward wall or limit of the engine enclosure.

An upright panel 25 is secured to each sill member 11 adjacent the side of the engine 13. As best shown in Figure 2 the upper marginal edge of each splash panel 25 is curved and has a radius of curvature less than the radii of the ground-engaging wheels 12.

The engine enclosure 24 includes a top cover member 26 illustrated in its normally closed position in Figure 1 and which is adapted to be swung on a transverse horizontal axis by means of suitable hinge supports to an open or raised position as shown in Figure 2 for affording access to the top of the engine 13. In a lowered position illustrated in Figure 1 the rear portion of the member 26 overlaps the cowl bar 23 and the forward portion rests upon resilient supports, not shown, carried by the uppermost edge of the radiator grille 15 and to which it is adapted to be detachably secured by suitable latching mechanism, not shown. Suitable struts 27 extending between and attached to the dash panel and the grille panel 15 are provided for rigidifying the upright grille panel 15.

A piano type hinge leaf 28 disposed vertically is fastened to each vertical side edge of the grille panel 15 by means of securing bolts 29. A pintle 30 having its upper end bent at right angles to the axis of the pintle is adapted to extend through the hinge leaf 28 and be supported thereby.

Extending between the grille panel 15 and the pillar posts 21 are a pair of removable sheet metal members 31, one of which is shown in Figures 1 and 2. It is to be understood that a similar member 31 is positioned at the opposite side of the engine 13. Each member 31 includes a generally vertically disposed wall 32 which is in substantially longitudinal alignment with the respective side marginal edge of the grille panel 15 and a pillar post 21 when in its inswung or closed position as shown in Figure 1. The forwardmost marginal edge of the wall 32 is provided with a hinge leaf 33 which is complementary to a hinge leaf 28 and is adapted to be rotatably supported on a pintle 30. The wall 32 of each member 31 includes an outer panel 34 and a ribbed inner panel 35. The uppermost marginal surfaces 36 of the walls 32 are horizontally disposed and are adapted to be engaged by the side marginal edges 37 of the top cover 26 when the top cover is in its lowered position and the members 31 are in their closed position. Weather stripping, not shown, is suitably secured to the top surfaces 36 for sealing the juncture between the top cover 26 and the walls 32. It will be noted that a substantially vertical plane passing through the side marginal edges of the grille panel 15 and a respective post 21 is laterally spaced between a wheel 12 and a chassis frame side sill member 11 and since the splash panel 25 is secured to the side of each channel member 11, each splash panel 25 is spaced inwardly laterally from such vertical plane. The splash panels 25 form the stationary section of the side walls of the engine enclosure 24 and the inner panels 35 serve as the movable parts of the engine enclosure side walls. The lower portion of each inner panel 35 is disposed inwardly when in the position shown in Figure 1 and is somewhat toroidal in shape so that the innermost edge of the portion 70 is in substantially vertical alignment with a respective splash panel 25 when the movable members 31 are in their inswung or closed position. The innermost edge of the portion 70 is arcuate in shape and has a radius of curvature somewhat greater than the radius of the wheel 12 so that the movable members 31 will clear the wheels when swung horizontally between their normal inswung positions and their outswung or open positions, as shown in Figure 2. Inasmuch as the upper marginal edge of each splash panel 25 has a radius of curvature less than the radius of the wheel 12 and the inner marginal edge of each portion 70 has a radius of curvature greater than the wheel 12, the inner edges of the portion 70 are vertically spaced above the uppermost edges of respective splash panels 25 when the members 31 are in their inswung position. A strip 71 of flexible material such as rubber or the like is suitably secured and depends from the innermost edge of each portion 70 and is adapted to bear against a respective splash panel 25 when in its closed position as shown in Figure 1. Thus the strips 71 flex and permit the members 31 to clear the wheels 12 when moved between their inswung and outswung positions and serve to bridge a gap between the inner edge of the portion 70 and the upper edges of the splash panels 25 when the members are in their inswung positions to completely isolate the interior of the engine compartment 24 from the ground-engaging wheels 12.

It will be apparent from the foregoing that the engine 13, radiator core 14 and other engine accessories are completely enclosed within the engine enclosure 24 when the members 31 are in their closed or inswung positions and the cover member 26 is in its lowered position. Consequently dirt, water and other foreign elements thrown by the wheels 12 during operation of the motor truck are prevented from entering the enclosure 24 and being deposited on the engine and accessories.

The swingable member 31 not only serves as movable side wall portions of the engine enclosure 24 but also has housings or fenders for the ground-engaging wheels 12. The outer panel 34 of each member 31 is formed with a generally horizontally disposed transversely extending portion 38 which is disposed directly over a respective wheel 12 to thereby cover the same when in its normal inswung position as shown in Figure 1. Depending from the end portions of the horizontal portion 38 are front plates 39 and rear plates 40 which are secured to the horizontal portions 38 by any suitable means. Horizontal portion 38, front plate 39 and rear plate 40 of each member 34 have an outer contour similar to that of conventional fenders. It will be appreciated that the above description of vehicle structure, described and claimed in patent application, Serial No. 449,740, now Patent Number 2,833,364, is not intended to limit the scope of the invention but rather to establish one of many possible environments therefor. Obviously, any conventional vehicle structure could be substituted for the foregoing structure, without departing from the spirit and scope of the invention.

A novel quick releasable locking device, designated generally by numeral 41 and shown in detail in Figures 3, 4 and 5, is provided for connecting each movable member 31 to respective door pillar post 21. Each locking device 41 includes a pair of vertically aligned socket elements 42 which are fastened to the forwardly facing surface 43 of a pillar post 21 by means of bolts 44 and project forwardly. While only one locking device 41 will be described in detail, it is to be understood that each member 31 is provided with such a locking device. As best shown in Figure 5, a bracket 45 and a rearwardly facing end wall 46 of the member 31 rotatably support a shaft 47 upon which a beveled gear 48 is suitably keyed. Bevel gear 48 meshes with a bevel gear 49 secured to a shaft 50 which extends through and is suitably journaled in the outer panel 34. An operating handle 51 is connected to the shaft portion projecting outwardly of the panel 34 for rotating the shaft 50 and thus shaft 47. A collar 52 is secured to the portion of the shaft 47 which extends rearwardly of the end wall 46. The collar 52 is provided with an integrally formed radially extending flange 53 which is provided with a pair of diametrically disposed radial slots 54. Secured to the end wall 46 are a pair of vertically spaced and aligned bearing members 55 which are disposed on diametrically opposite sides of the shaft 47 and provided with vertically aligned bores 56. A latch bolt 57 is slidably mounted in the bore 56 of each bearing bracket 55. A portion of each latch bolt 57 has screw threads formed therein into which one end of a rod 58 is threaded. Each rod 58 also carries a jam nut 59 which is adapted to bear against a respective latch bolt 57 to prevent unthreading of the rod from the latch bolt. By virtue of the above described structure it will be appreciated that the length of each rod and latch bolt assembly is individually capable of being adjusted and maintained. The free end of each rod 58 carries a pin 60 which extends through a respective slot 54 in flange 53 and is thus operatively connected to the flange 53. It will be obvious that clockwise rotation of shaft 47 as viewed in Figure 4 will cause latch bolts 57 to slide vertically inwardly toward each other simultaneously to positions wherein the terminal ends 61 are retracted and completely disposed within the bores 56 of the bearing members 55. As shown in Figures 3 and 4 a helical spring 62 encircles a lower rod 58 and has one end abutting the jam nut 59. The opposite end of the spring 62 bears against a leg 63 of an L-shaped bracket which is fastened to the end wall 56 of the member 31. The spring 62 yieldably urges the latch bolts 57 vertically outwardly to their locking positions shown in Figures 3 and 4 wherein the terminal end 61 of the upper bolt 57 is disposed above the upper surface 64 of the upper bearing member 55 and a terminal end 61 of the lower latch bolt 57 is disposed below the lower surface 65 of the lower bearing member 55.

Referring to Figures 3 and 4, it will be noted that the lowermost surface 66 of the upper socket element 42 and the uppermost surface 67 of the lower socket element 42 are substantially flat and lie in planes in which longitudinally extending lines contained in each plane intersect at a point spaced rearwardly of the pillar post 21 and transversely extending lines contained in each plane intersect at a point spaced inwardly of the pillar post 21. The upper surface 64 of the upper bearing member 55 and the lower surface 65 of the lower bearing member 55 are complementary to and adapted to abut the lower surface 66 of the upper socket element 42 and the upper surface 67 of the lower socket element 42, respectively, when the member 31 is swung horizontally inwardly to its closed position, as shown in Figure 1. Stated in another way, each pair of complementary abutting surfaces 66, 67 lie in a plane which is angularly oriented less than 90° with respect to a vertical plane parallel to the longitudinal axis of the chassis frame 10 and containing the pintle 30. Also, each of the planes in which the abutting surfaces 66, 67 lie is angularly oriented less than 90° with respect to a vertical transversely extending plane parallel to axis of the pintle 30. In other words, the engages surfaces 66, 67 are inclined toward each other inwardly of the vehicle and rearwardly of the pillar post 21.

The terminal ends 61 of the latch bolts 57 are cone-shaped and are adapted to be received in complementary tapered bores 68 formed in the socket elements 42 when the member 31 is in its completely closed position and extend vertically through the socket elements. As best shown in Figure 2, a vertically extending strip 69 of rubber or like material is fastened to each side of the cowl bar 23 which is engaged by the inner panel 35 of the swingable member 31 when it is in its completely closed position. It will be appreciated from the foregoing that if the bores 56 of the bearing brackets 55 are not exactly in vertical alignment with the tapered bores 68 formed in the socket element 42, only the extreme tips of the cone-shaped terminals ends 61 project into the bore 68. However, continued rotation of the flange 53 in a counterclockwise direction, as viewed in Figure 4, to force the latch bolts 57 vertically outwardly until the terminal ends 61 are completely seated in the bores 68 will cause the free end of the member 31 to be cammed thereby to a position wherein the bores 56 and 68 are substantially in vertical alignment. Inasmuch as the mating surfaces 64, 65, 66 and 67 are disposed as described above, such camming action causes a respective mating surface to be forced tightly into wedging engagement with each other and the member 31 tends to pivot horizontally inwardly and to move horizontally longitudinally rearwardly with respect to the supporting pintle 30. Thus it will be appreciated that by virtue of the lock device 41 the member 31 is prevented from moving vertically and horizontally with respect to the grille panel 15 and the pillar post 21 to which it is detachably connected and the possibility of member 31 becoming loose during use of the motor truck to cause rattling or squeaking is mitigated if not eliminated entirely.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A releasable lock device for securing the free end of a motor vehicle body part having one end pivotally supported by a longitudinally extending chassis frame for horizontal swinging movement to and from a normal, inswung position about a vertical axis with respect to the chassis frame, comprising a first element rigid with respect to the chassis frame and longitudinally spaced from said vertical axis, the bottom surface of said element being substantially flat; a second element rigidly carried by the free end of said body part having a flat top surface adapted to abut the bottom surface of said first element once said body part is in its normal position, said abutting surfaces lying in a plane disposed at an acute angle with respect to a vertical plane containing the pivotal axis of said body part and parallel to the longitudinal axis of said chassis frame and at an acute angle with respect to a vertical plane parallel to the pivotal axis and parallel to the transverse axis of said chassis frame; and cam means vertically extensible through the plane in which said abutting surfaces lie to force said abutting surfaces tightly together.

2. A releasable lock device substantially as set forth in claim 1, in which, said cam means includes a latch bolt carried by said second element, said latch bolt having a cone-shaped end adapted to be received in a complementary cone-shaped bore in said first element.

3. In a motor vehicle having a door pillar post and a wheel cover structure having one end pivotally connected to a fixed part of the vehicle longitudinally spaced from said pillar post for horizontal swinging movement about a vertical axis between a normal, inswung position wherein said structure overlies a ground-engaging wheel and extends longitudinally between said fixed part of the vehicle and said pillar post and an outswung position wherein the wheel is uncovered; the combination comprising, a releasable lock device for securing said wheel cover structure in its normal position including a pair of vertically spaced socket elements secured to said post and longitudinally spaced from said pivotal axis, said elements having vertically aligned bores; a pair of vertically spaced bearing members secured to said wheel cover structure having vertically aligned bores, each of said bearing members having a surface engaging a surface of a respective socket element, said engaging surfaces lying in a plane inclined with respect to a transversely extending vertical plane and inclined with respect to a longitudinally extending vertical plane containing the pivotal axis of said wheel cover structure, said bearing member bores being vertically aligned with said socket element bores when said structure is in its normal, inswung position; a latch bolt slidably mounted in the bore of each bearing member, said latch bolts being vertically slidable between a locked position wherein they extend through the socket element bores and a retracted, unlocked position where they are withdrawn from said socket element bores; and handle means for simultaneously effecting sliding movement of said latch bolts.

4. A releasable lock device substantially as set forth in claim 3, in which, in a vertical transverse section of the vehicle, the engaging surfaces are inclined toward each other inwardly of said pillar post.

5. A releasable lock device substantially as set forth in claim 4, in which, in a vertical longitudinal section, the engaging surfaces are inclined toward each other rearwardly of said pillar post.

6. A releasable lock device substantially as set forth in claim 5, in which, cam means are provided for forcing said engaging surfaces tightly together, said means including a cam head carried by each latch bolt.

References Cited in the file of this patent

UNITED STATES PATENTS

| 313,876 | McArthur | Mar. 17, 1885 |
| 1,878,248 | Moore | Sept. 20, 1932 |
| 1,964,114 | Gerlach | June 26, 1934 |
| 2,209,727 | Gibson | July 30, 1940 |
| 2,447,898 | Colaner | Aug. 24, 1948 |

FOREIGN PATENTS

| 682,661 | Great Britain | Nov. 12, 1952 |
| 694,871 | Great Britain | July 29, 1953 |